(12) United States Patent  
Alexander, Jr. et al.

(10) Patent No.: US 6,501,749 B1  
(45) Date of Patent: Dec. 31, 2002

(54) SYSTEM AND METHOD FOR DATA TRANSMISSION ACROSS A LINK AGGREGATION

(75) Inventors: Cedell Adam Alexander, Jr., Durham, NC (US); Arush Kumar, Durham, NC (US); Loren Douglas Larsen, Durham, NC (US); Jeffrey James Lynch, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/344,652

(22) Filed: Jun. 25, 1999

(51) Int. Cl.[7] .................................. H04J 15/00
(52) U.S. Cl. ..................... 370/351; 370/390
(58) Field of Search .................. 370/389, 392, 370/401, 402, 407, 390, 468, 351

(56) References Cited

U.S. PATENT DOCUMENTS

| | | | |
|---|---|---|---|
| 5,309,430 A | 5/1994 | Verhille et al. ............... 370/60 |
| 5,404,461 A | 4/1995 | Olnowich et al. ............ 395/325 |
| 5,436,893 A | 7/1995 | Barnett ........................ 370/60.1 |
| 5,511,168 A | 4/1996 | Perlman et al. ............ 395/200.15 |
| 5,684,800 A | 11/1997 | Dobbins et al. ............. 370/401 |
| 5,689,505 A | 11/1997 | Chiussi et al. .............. 370/388 |
| 5,724,351 A | 3/1998 | Chao et al. .................. 370/395 |
| 5,781,535 A * | 7/1998 | Russ et al. .................. 370/248 |
| 5,835,482 A * | 11/1998 | Allen ........................... 370/225 |
| 6,049,528 A * | 4/2000 | Hendel et al. ............... 370/235 |

OTHER PUBLICATIONS

Keun–Bae Kim et al., *IEEE Global Telecommunications Conference*, "A Growable ATM Switch with Embedded Multi–Channel/Multicasting Property", Phoenix, Arizona, Nov. 3–8 1997, pp. 222–226.

*IBM Technical Disclosure Bulletin*, "Hybrid Switch Control Scheme for Fast Point–to–Point/Multicast/Hunt–Group Connection Setup", vol. 37 No. 11, Nov. 1994, pp. 641–645.

*IBM Technical Disclosure Bulletin*, "Multicast Mechanism for Switched Multimegabit Data Service Intra Node Multicast Mechanism", vol. 40 No. 03, Mar. 1997, pp. 181–182.

* cited by examiner

*Primary Examiner*—Melvin Marcelo
*Assistant Examiner*—Scott Waite
(74) *Attorney, Agent, or Firm*—Winstead, Sechrest & Minick, P.C.

(57) ABSTRACT

When multi-destination traffic is distributed through a host or switch, the decision to distribute each frame is performed by each egress port and not the ingress port. Within a link aggregation group, the multi-destination frame is sent to each of the egress ports within the link aggregation group. Each of such ports will then determine whether it should re-transmit the frame. If not, the frame is discarded.

16 Claims, 4 Drawing Sheets

SYSTEM AND METHOD FOR DATA TRANSMISSION ACROSS A LINK AGGREGATION

TECHNICAL FIELD

The present invention relates in general to data processing systems, and in particular, to switching of data transmissions in a network.

BACKGROUND INFORMATION

In a networking environment, it is typical that a plurality of devices will be linked together for the purpose of transmitting data from one device to another in the network. In a large network, it would be uneconomical to provide a specific data link connecting each device to each of the other devices in the network. In order to provide connectivity from each device to each of the other devices in the network in an efficient and economical manner, a plurality of methods have been developed.

One well known method of distributing data between devices within a network is through switches (also referred to herein as network nodes). Switches may be utilized within the network to receive data from a plurality of devices and distribute the data to a plurality of devices to reduce the amount of data lines required to distribute data. To utilize switches to communicate between devices, each device has a specific address. For example, in an Ethernet switching environment, each device in the network has a media access control (MAC) address, which uniquely identifies the device in the network. Frames of data are delivered to a MAC destination address (DA) and senders are recognized by a MAC source address (SA). Each switch, and each port on a switch, supports a finite number of MAC addresses. Ideally, the overall number of MAC addresses distributed by a switch should be large, so the switch can support a large number of devices.

In addition to supporting a large number of devices, a switch should comprise the ability to handle transfer of large amounts of data through a network. For a switch to handle quick transfer of large amounts of data, often link aggregation is utilized in order to allow a switch to support a higher bandwidth interface to increase the rate of data transfer. Link aggregation is a technique that allows parallel physical links between switches or between a switch and a server to be used simultaneously, multiplying the bandwidth between the devices. Link aggregation may be further defined as a method of grouping physical link segments of the same media type and speed, and treating them as if they were part of a single, logical link segment. For example, two 100 Mbps links between switches may be grouped into a link aggregation and treated as a single 200 Mbps link to create a higher bandwidth interface between the two switches.

In designing a switch that supports transmission of multicast or broadcast traffic, there are two general approaches that can be used to transmit packets within the switch to their outbound (egress) ports. The first solution is to simply send the packet once to each outbound port. The second solution is to use a one-to-many solution that allows one transmit with multiple destinations. The first solution is generally more costly because it requires more processor cycles to perform the multiple transmits, and may require additional buffers. The second solution is generally more efficient from a processor perspective because it requires a single transmit of a single buffer, but may require a more sophisticated bus/switching fabric to exist between the ports.

In architectures that support a one-to-many transmission, transmitting traffic out more than one outbound port (multi-destination traffic) is fairly simple until the egress ports need to handle the frames differently based on criteria such as a link aggregation virtual interface. With multiple permutations of these possible groups, creating and managing multicast groups at the sender becomes complex, particularly when the sender is a high-bandwidth/low-latency processor on the forwarding path of a high-speed switch, i.e. there are no extra cycles available for such complex management. In such a situation, maintaining a small number of multicast groups at the sender is profitable, and the determination of whether or not to transmit a particular broadcast/multicast frame is now made at the outbound port.

The specific problem addressed here is how to use a one-to-many transmit strategy for link aggregation. In link aggregation, there is a requirement that frames not be duplicated on the link aggregation group ("LAG"), i.e. a frame destined for the LAG must be transmitted on exactly one link. Additionally, it is required that frames be delivered to the destination in the order they were transmitted from the source. In an architecture using a one-to-many transmit design for multi-destination traffic, some method must be employed to guarantee that traffic is transmitted on exactly one port. Additionally, the method should allow distribution of multi-destination traffic over a range of the physical links that belong to the LAG, as opposed to merely designating one port to handle such multi-destination traffic.

SUMMARY OF THE INVENTION

Link aggregation architectures often impose a restriction that traffic must arrive at the destination in the order it was transmitted from the source. In order to guarantee this, link aggregation systems usually assign flows to physical links, where a flow is at a minimum determined by the destination MAC address, and possibly includes the source MAC, or higher layer criteria (such as IP address, UDP port, etc.). A distribution algorithm is used to determine on which physical link in the LAG a particular frame should be transmitted, and the frame is directed through the switch to that particular port.

In the case of multi-destination traffic in a one-to-many design, the frame must be delivered to all ports. In the case of physical ports that are members of a LAG, a decision is made at the egress port determining whether or not to transmit this multi-destination frame. The present solution is to run the distribution algorithm on the candidate outbound frame to obtain the number of the physical interface on which the frame should be transmitted. If the physical interface provided by the distribution algorithm matches the interface number of the egress port, then the frame is transmitted, otherwise the frame is discarded.

The distribution algorithm must return the same result at each LAG port for a given frame.

The above algorithm guarantees that frames are not duplicated across the LAG, and allows efficient implementation of transmission of multi-destination traffic through the switch.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
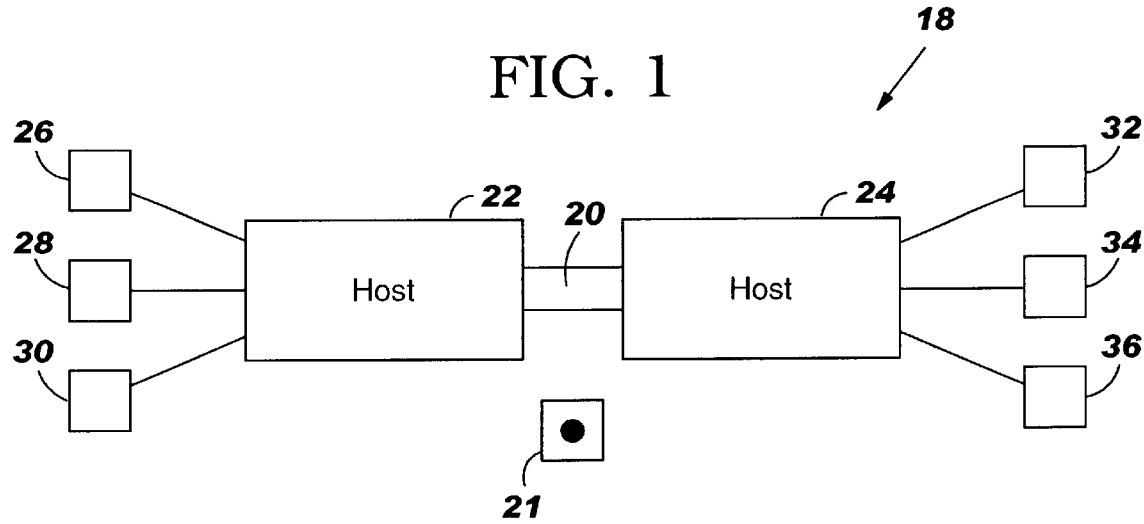
FIG. 1 is an illustration of a high level block diagram of a link aggregation between two hosts for transmitting data between the hosts which may be utilized to implement the method and system of the present invention.

In the following description, numerous specific details are set forth such as specific data packet configurations, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

With reference now to the figures and in particular with reference to FIG. 1, there is depicted a high level block diagram illustrating a network 18 which may be utilized to implement the method and system of the present invention. As illustrated, the network 18 may be constructed utilizing a link aggregation 20 for transmitting data between the hosts 22 and 24. Software which directs the implementation of a flow transmission controller of the present invention may be provided to host 22 and/or host 24 for storage in host 22 and/or host 24 via a variety of signal-bearing media which include, but are not limited to writeable storage media such as floppy diskette 21. Hosts 22 and 24 preferably include a permanent storage medium (not shown) such as read-only memory (ROM) for storing the software and a temporary storage medium (not shown) such as random access memory (RAM) for supporting the implementation of the software as will be further described.

Hosts 22 and 24 may be each a switch, which may be an Ethernet switch, or hosts 22 and 24 may be each a server. Hereinafter, hosts 22 and 24 will also be referred to as network nodes. Each of the hosts 22 and 24 is networked with a plurality of devices where host 22 is connected to devices 26, 28 and 30 and host 24 is connected to devices 32, 34 and 36. Those skilled in the art will appreciate that devices 26, 28, 30, 32, 34 and 36 may represent a plurality of devices which may be included in network 18, including additional hosts, and the plurality of devices may be networked with other devices not shown in the present embodiment.

Figure 2:
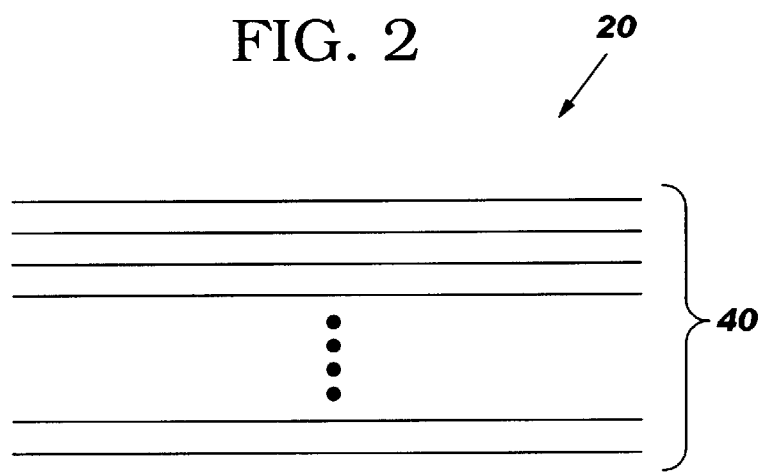
FIG. 2 is a more detailed diagram of a link aggregation which may be utilized to implement the method and system of the present invention.

Referring now to FIG. 2, there is depicted link aggregation 20 with k links as illustrated at reference numeral 40. It is preferable that each of the k links illustrated at reference numeral 40 has similar bandwidth properties, however not required. As previously described, it is desirable to be able to bundle a number of physical links together to form a link aggregation group for optimizing bandwidth between switches. The k links illustrated at reference numeral 40 which are bundled into the link aggregation 20 appear as a MAC interface to higher layer protocols and thereby may be utilized with a plurality of networking protocols.

Still referring now to FIG. 2, the k links illustrated at reference numeral 40 are not restricted to contiguous physical numbering or starting with link number 1. For example, if k=4, the physical link numbers may be identified as links 1, 2, 3, 4 where the link numbers are contiguous and start with link number 1 or the link numbers may be identified as links 3, 5, 6, 12 where the link numbers are not contiguous. However, in both cases, there is a first link, a second link, a third link and a fourth link in the k=4 link aggregation 20 regardless of the actual link number. For purposes of illustration hereon, the links utilized are contiguous and start with a link number 1. However, each of the applications of links numbers may be implemented with non-contiguous numbers which may or may not start with link number 1.

Figure 3:
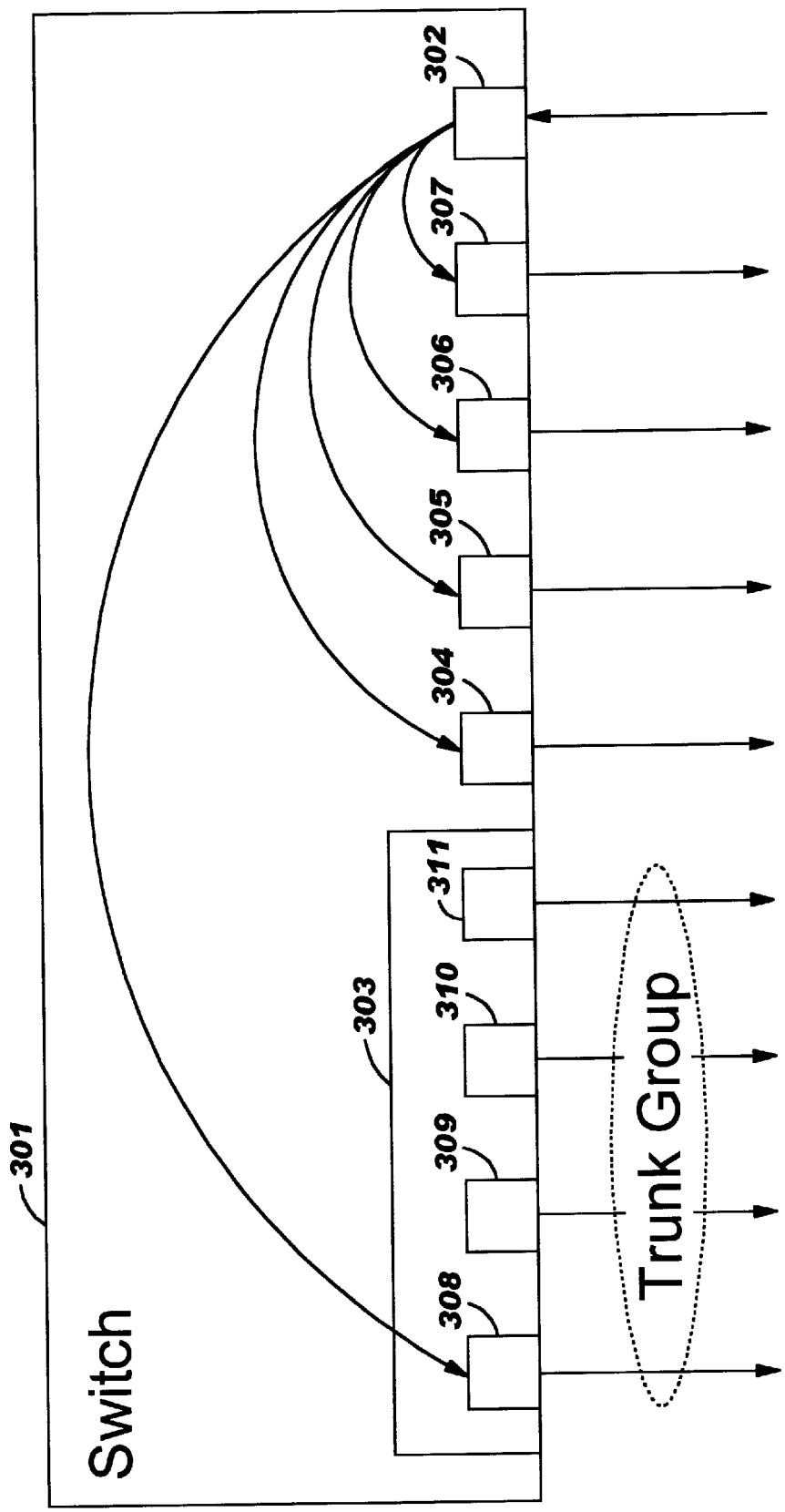
FIG. 3 illustrates ingress port filtering for a multi-destination forwarding of data.

Referring next to FIG. 3, there is illustrated port-based multi-destination forwarding of data through a switch 301 received at a port 302. The data is to be forwarded by switch 301 to ports 304–307 and through the ports 308–311 within link aggregation group 303. With such a prior art process, the ingress port 302 realizes multiple ports are part of the trunk group or lag 303, and subsequently delivers the multi-destination data frames only to a single port (port 308) within the group 303 for transmission. There are implications with such a process. The trunk group 303 is not required to send all multi-destination/multi-cast traffic on the same output link (only the traffic with the same "address"). So, depending on the distribution algorithm, multicast frames may be transmitted on different links in the trunk group 303. For load balancing reasons, this could change dynamically. As a result, this requires the ingress port 302 to understand the trunk group distribution algorithm and to keep up with the dynamic changes to the distribution scheme due to load balancing. This would require additional state information to be kept within the ingress port 302, along with the corresponding additional processing required within ingress port 302.

Figure 4:
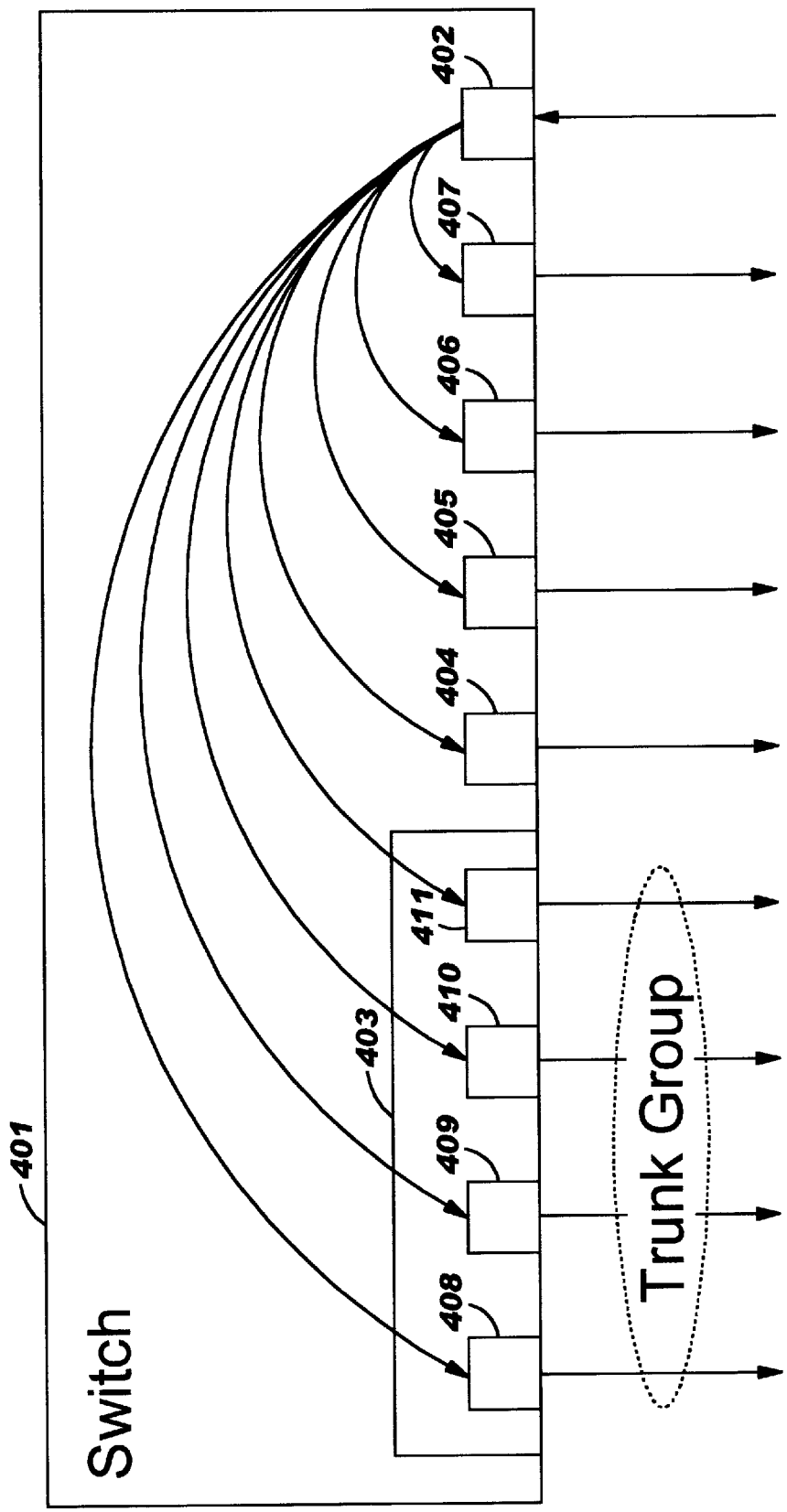
FIG. 4 illustrates egress port filtering for a multi-destination forwarding of data.

Referring to FIG. 4, there is illustrated a process for egress port filtering in accordance with the present invention for delivering multi-destination/multicast data frames through a switch 401. The multi-destination data frames are received by ingress port 402, and are multicast to all of the egress ports 404–407, and to the trunk group, lag, 403. However, the difference is that multi-destination frames are delivered to each output port 408–411 within the lag 403. Each egress port 408–411 determines whether it should transmit the multi-destination/multicast frame or not based on a trunk group distribution algorithm. This removes the necessity of the source port 402 understanding and processing the trunk group distribution algorithm.

Figure 5:
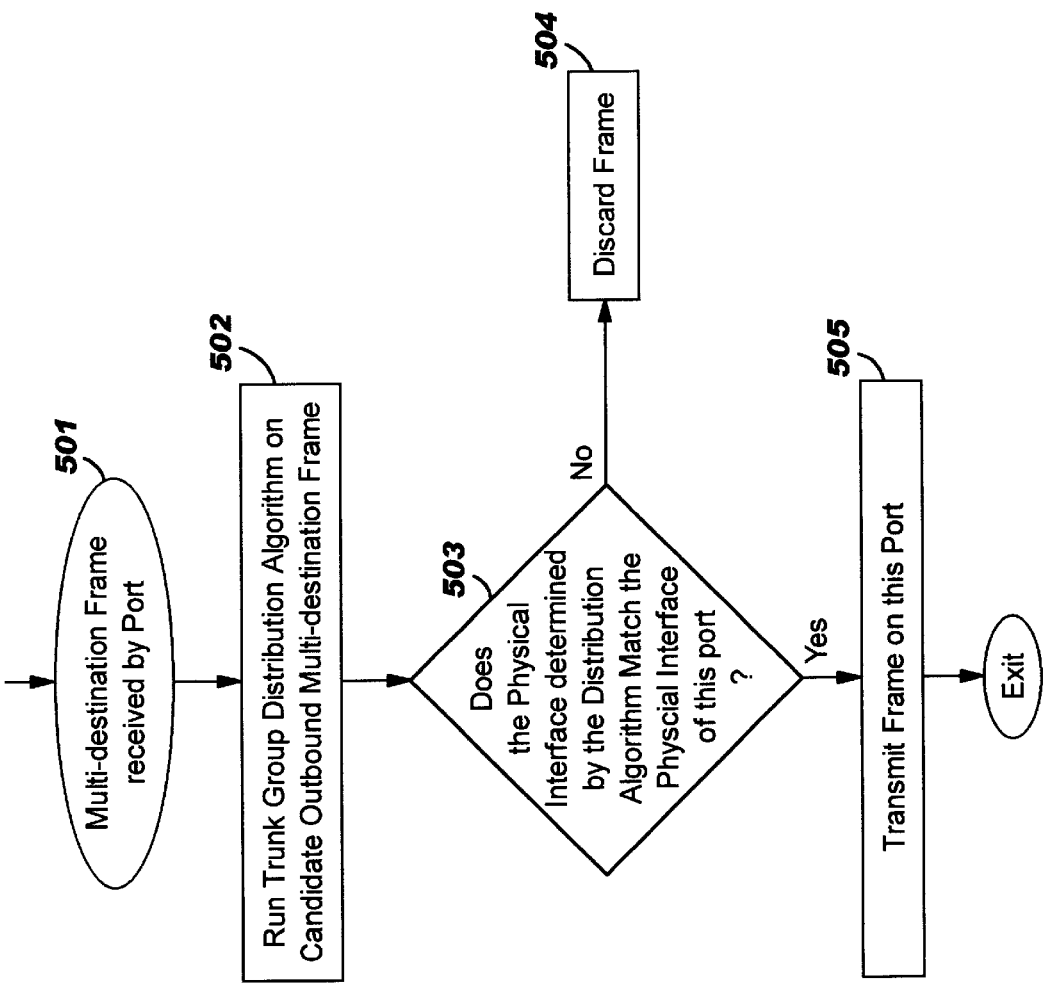
FIG. 5 illustrates an algorithm for implementing egress port filtering as described above with respect to FIG. 4.

FIG. 5 illustrates the process implemented within each of egress ports 408–411. In step 501, a multi-destination frame is received by the port. In step 502, a trunk group distribution algorithm is run on the candidate outbound multi-destination frame. Such a distribution algorithm is used to determine on which physical link in the lag 403 a particular frame should be transmitted. This can be determined by the destination MAC address, or as described above, some higher layer criteria such as the IP address. Nevertheless, each of the egress ports 408–411 processes the distribution algorithm. In step 503, a determination is made whether the physical interface determined by the distribution algorithm matches the physical interface of the particular port running the algorithm. For example, the distribution algorithm will be run to determine the physical interface or port through which it is supposed to be sent. If this process is run in egress port 408, and the result of the operation of the distribution algorithm is port 408, then that particular frame will be transmitted by egress port 408. This process is repeated for each frame received by each of the egress ports 408–411. If the physical interface of the port is not the same as that determined by the distribution algorithm, then the frame is discarded in step 504. It is not important here to describe any particular distribution algorithm. Such are discussed in U.S. patent application Ser. No. 09/207962 entitled "System for Data Transmission Across a Link Aggregation," which is hereby incorporated by reference herein.

Although the present invention and its advantages have been described in detail, it should be understood that various changes, substitutions and alterations can be made herein without departing from the spirit and scope of the invention as defined by the appended claims.

What is claimed is:

1. A method for data transmission across a link aggregation group ("LAG"), comprising the steps of:
   receiving a data portion at an ingress port in a data processing node;
   sending the data portion to each of a plurality of egress ports within a LAG;
   running a distribution algorithm in each of the plurality of egress ports with respect to further transmission of the data portion;
   in each of the plurality of egress ports, if the running step determines that the data portion is to be further transmitted by the egress port, transmitting the data portion from the egress port; and
   in each of the plurality of egress ports, if the running step determines that the data portion is not to be further transmitted by the egress port, discarding the data portion.

2. The method as recited in claim 1, wherein the data portion is a frame of data.

3. The method as recited in claim 1, wherein the data processing node is a switch.

4. The method as recited in claim 1, wherein the running step further comprises the step of:
   determining if the physical interface computed by the distribution algorithm matches the physical interface of the egress port in which the distribution algorithm is running.

5. The method as recited in claim 1, further comprising the step of:
   sending the data portion by the ingress port to other egress ports not within the LAG.

6. A multi-destination forwarding switch comprising:
   a link aggregation group ("LAG") comprising a plurality of egress ports;
   an ingress port for receiving a data portion and then sending the data portion to each of the plurality of egress ports within the LAG;
   a distribution algorithm running in each of the plurality of egress ports with respect to further transmission of the data portion on outbound trunk coupled to the egress ports;
   in each of the plurality of egress ports, if the distribution algorithm determines that the data portion is to be further transmitted by the egress port, circuitry for transmitting the data portion from the egress port over its respective outbound trunk; and
   in each of the plurality of egress ports, if the distribution algorithm determines that the data portion is not to be further transmitted by the egress port, circuitry for discarding the data portion.

7. The switch as recited in claim 6, wherein the data portion is a frame of data.

8. The switch as recited in claim 6, wherein the distribution algorithm further comprises:
   circuitry for determining if the physical interface computed by the distribution algorithm matches the physical interface of the egress port in which the distribution algorithm is running.

9. A computer program product adaptable for storage on a computer readable medium, comprising the program steps of:
   receiving a data portion at each of a plurality of egress ports within a LAG;
   running a distribution algorithm in each of the plurality of egress ports with respect to further transmission of the data portion;
   in each of the plurality of egress ports, if the running step determines that the data portion is to be further transmitted by the egress port, transmitting the data portion from the egress port; and
   in each of the plurality of egress ports, if the running step determines that the data portion is not to be further transmitted by the egress port, discarding the data portion.

10. The computer program product as recited in claim 9, wherein the data portion is a frame of data.

11. The computer program product as recited in claim 9, wherein the data processing node is a switch.

12. The computer program product as recited in claim 9, wherein the running step further comprises the step of:
   determining if the physical interface computed by the distribution algorithm matches the physical interface of the egress port in which the distribution algorithm is running.

13. The computer program product as recited in claim 9, further comprising the program step of:
   sending the data portion by the ingress port to other egress ports not within the LAG.

14. A network comprising:
   a first host;
   a second host;
   a link aggregation group of trunks connected between the first and second host;
   a network node;
   an ingress port in the first host operable for receiving a frame of data from the network node;
   a plurality of egress ports in the first host coupled to the link aggregation group;
   circuitry in the first host for sending the frame of data to each of the plurality of egress ports;
   circuitry for running a distribution algorithm in each of the plurality of egress ports with respect to further transmission of the frame of data;
   in each of the plurality of egress ports, if the distribution algorithm determines that the frame of data is to be further transmitted by the egress port, transmitting the frame of data from the egress port; and in each of the plurality of egress ports, if the distribution algorithm determines that the frame of data is not to be further transmitted by the egress port, discarding the frame of data.

15. The network as recited in claim 14, wherein the running circuitry further comprises:

circuitry for determining if the physical interface computed by the distribution algorithm matches the physical interface of the egress port in which the distribution algorithm is running.

16. The network as recited in claim 14, further comprising:

circuitry in the first host for sending the frame of data by the ingress port to other egress ports not within the LAG.

* * * * *